US007470741B2

(12) United States Patent
Dams

(10) Patent No.: US 7,470,741 B2
(45) Date of Patent: Dec. 30, 2008

(54) FLUOROCHEMICAL COMPOSITION AND METHOD OF TREATMENT OF A SUBSTRATE THEREWITH TO RENDER SUBSTRATE OIL- AND/OR WATER REPELLENT

(75) Inventor: Rudolf J. Dams, Zwijndrecht (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/444,879

(22) Filed: May 23, 2003

(65) Prior Publication Data
US 2003/0224112 A1 Dec. 4, 2003

(30) Foreign Application Priority Data
Jun. 3, 2002 (EP) ................... 02100649

(51) Int. Cl.
*C08K 3/00* (2006.01)
(52) U.S. Cl. .................. 524/544; 427/340; 427/344; 556/485
(58) Field of Classification Search ................ 524/544; 556/485; 427/340, 344
See application file for complete search history.

(56) References Cited

U.S. PATENT DOCUMENTS

| | | | |
|---|---|---|---|
| 2,803,615 A | 8/1957 | Ahlbrecht et al. | |
| 3,810,874 A | 5/1974 | Mitsch et al. | |
| 4,085,137 A | 4/1978 | Mitsch et al. | |
| 4,614,667 A | 9/1986 | Larson et al. | |
| 4,633,004 A | 12/1986 | Boutevin et al. | |
| 4,687,707 A | 8/1987 | Matsuo et al. | |
| 4,761,459 A | 8/1988 | Matsuo et al. | |
| 4,889,656 A | 12/1989 | Flynn et al. | |
| 4,927,950 A | 5/1990 | Hisamoto et al. | |
| 5,274,159 A | 12/1993 | Pellerite et al. | |
| 5,292,796 A | 3/1994 | Dams et al. | |
| 5,306,758 A | 4/1994 | Pellerite | |
| 5,442,011 A | 8/1995 | Halling | |
| 5,453,540 A | 9/1995 | Dams et al. | |
| 5,482,991 A | 1/1996 | Kumar et al. | |
| 5,527,931 A | 6/1996 | Rich et al. | |
| 5,550,184 A | 8/1996 | Halling | |
| 5,578,278 A | 11/1996 | Fall et al. | |
| 5,608,003 A | 3/1997 | Zhu | |
| 5,644,014 A | 7/1997 | Schmidt et al. | |
| 5,658,962 A | 8/1997 | Moore et al. | |
| 5,727,931 A | 3/1998 | Lash et al. | |
| 5,739,369 A | 4/1998 | Matsumura et al. | |
| 5,760,126 A | 6/1998 | Engle et al. | |
| 5,919,886 A | 7/1999 | Matsuda et al. | |
| 5,922,787 A | 7/1999 | Kondo et al. | |
| 5,980,992 A | 11/1999 | Kistner et al. | |
| 5,998,549 A | 12/1999 | Milbourn et al. | |
| 6,054,601 A | 4/2000 | Standke et al. | |
| 6,156,860 A | 12/2000 | Tanaka et al. | |
| RE37,022 E | 1/2001 | Sugiyama et al. | |
| 6,183,872 B1 | 2/2001 | Tanaka et al. | |
| 6,218,499 B1 | 4/2001 | Tarumi et al. | |
| 6,221,434 B1 | 4/2001 | Visca et al. | |
| 6,361,870 B1 | 3/2002 | Steffl et al. | |
| 6,485,838 B1 | 11/2002 | Shimada et al. | |
| 6,649,272 B2 | 11/2003 | Moore et al. | |
| 2003/0124361 A1 | 7/2003 | Moore et al. | |
| 2003/0168783 A1* | 9/2003 | Dams ..................... 264/602 | |
| 2005/0136264 A1 | 6/2005 | Dams et al. | |

FOREIGN PATENT DOCUMENTS

| | | |
|---|---|---|
| EP | 0 248 383 | 12/1987 |
| EP | 0 426 530 | 5/1991 |
| EP | 0 433 070 | 6/1991 |

(Continued)

OTHER PUBLICATIONS

Arkles, "Tailoring Surfaces with Silanes", Chemtech, v. 7, pp. 766-778, Dec. 1977.

(Continued)

*Primary Examiner*—Peter D. Mulcahy
*Assistant Examiner*—Henry Hu
(74) *Attorney, Agent, or Firm*—Kathleen B. Gross; Robert H. Jordan

(57) ABSTRACT

The present invention provides a fluorochemical composition comprising: (a) one or more fluorochemical oligomers derivable from a free radical polymerization of one or more fluorinated monomers and optionally one or more non-fluorinated monomers in the presence of a chain transfer agent, said fluorochemical oligomer being free of acid groups and comprising one or more groups of the formula:

$$-M^1(R)_q(Y)_{p-q-1} \quad (I)$$

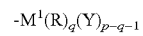

wherein $M^1$ is selected from the group consisting of Si, Ti, Zr, B, Al, Ge, V, Pb, Sn and Zn, R represents a non-hydrolysable group, Y represents a hydrolysable group, q is 0, 1 or 2, p equals the valence of $M^1$ and is 3 or 4 and $p-q-1$ is at least 1;
(b) one or more non-fluorinated compounds of an element $M^2$ selected from the group consisting of Si, Ti, Zr, B, Al, Ge, V, Pb, Sn and Zn and having at least two hydrolysable groups per molecule in an amount sufficient to form a polycondensation product upon reaction with said fluorochemical oligomer (a);
(c) water; and
(d) an organic solvent in an amount sufficient to dissolve and/or disperse components (a), (b) and (c).

The invention also provides compositions comprising condensates of components (a) and (b) of the above composition and a method of treatment of substrates therewith.

14 Claims, No Drawings

FOREIGN PATENT DOCUMENTS

| | | |
|---|---|---|
| EP | 0 166 363 | 8/1991 |
| EP | 0 222 157 | 12/1992 |
| EP | 0 526 976 | 2/1993 |
| EP | 0 337 474 | 7/1994 |
| EP | 0 738 771 | 10/1996 |
| EP | 0 797 111 | 9/1997 |
| EP | 0 844 265 | 5/1998 |
| EP | 0 933 377 | 8/1999 |
| EP | 0 937 748 | 8/1999 |
| EP | 933377 A2 * | 8/1999 |
| EP | 937748 A2 * | 8/1999 |
| EP | 0 978 524 | 2/2000 |
| EP | 978524 A1 * | 2/2000 |
| EP | 1 059 320 | 12/2000 |
| EP | 1225188 A1 * | 7/2002 |
| EP | 1 054 047 | 3/2003 |
| GB | 2 218 097 | 11/1989 |
| JP | 62-63560 | 3/1987 |
| JP | 07-062997 | 8/1993 |
| JP | 5-331455 | 12/1993 |
| JP | 7247461 | 9/1995 |
| JP | 11172200 | 6/1999 |
| JP | 2000169483 | 6/2000 |
| JP | 2000-273396 | 10/2000 |
| JP | 2000351941 | 12/2000 |
| JP | 2001049173 | 2/2001 |
| JP | 2001049181 | 2/2001 |
| WO | WO 96/16630 | 6/1996 |
| WO | WO 97/00230 | 1/1997 |
| WO | WO 99/03941 | 1/1999 |
| WO | WO 99/29636 | 6/1999 |
| WO | WO 99/37720 | 7/1999 |
| WO | WO 02/30848 | 4/2002 |

OTHER PUBLICATIONS

A.D. Jenkins, et al., Glossary of Basic Terms in Polymer Science, International Union of Pure and Applied Chemistry, pp. 2287-2311, 1996, printed in Great Britain.

American Association Textile Chemists and Colorists (AATCC) Technical Manual, Water Repellency: Spray Test, pp. 70 and 71, AATCC Test Method 22, 1985.

U.S. Appl. No. 10/053,001, filed Jan. 17, 2002, Water Soluble or Water Dispersible Fluorochemical Silanes for Rendering Substrates Oil and Water Repellent.

U.S. Appl. No. 10/053,396, filed Jan. 17, 2002, Fluorochemical Composition Comprising a Fluorochemical Oligomeric Silane for Rendering Substrates Oil and Water Repellent.

* cited by examiner

FLUOROCHEMICAL COMPOSITION AND METHOD OF TREATMENT OF A SUBSTRATE THEREWITH TO RENDER SUBSTRATE OIL- AND/OR WATER REPELLENT

1. FIELD OF INVENTION

The present invention relates to a fluorochemical composition comprising (a) a fluorochemical oligomer that comprises one or more groups capable of undergoing a polycondensation reaction and (b) a non-fluorinated compound that has groups capable of polycondensation. The invention also relates to compositions that comprise a partial or substantially complete condensate of the components (a) and (b). The invention further relates to a method of treatment of a substrate with any of these compositions, which may render the substrate oil- and/or water repellent. The substrate may thereby also be rendered more easy to clean and will generally be more stain resistant.

2. BACKGROUND OF INVENTION

In the past, various efforts have been made to provide repellent properties to a substrate. For example, U.S. Pat. No. 4,687,707 (=EP-A-0 166 363) describes a low reflectance, transparent material having anti-soiling properties, which comprises a transparent substrate having a coating comprising a thin layer of a condensation product of a fluorine containing silicon compound having a polyfluorinated or perfluorinated carbon chain.

WO 99/03941 relates to a coating material comprising condensates of at least one compound (A) of the general formula $R_aMZ_b$ (a=0 to 3; b=1 to 4; a+b=3, 4), and at least one compound (B) of the general formula $R'_xMZ_y$ (x=1 to 3; y=1 to 3; x+y=3,4), wherein R is a non-hydrolysable organic group, M is an element selected from the main groups III to V or from the subgroups II to IV of the periodic table of elements, Z is a hydrolysable group, and at least one R' contains a perfluoropolyether structure separated from M by at least two atoms, and at least one R is not equal to at least one R'. The composition is used to provide oleophobic properties to substrates, such as porous polymers.

U.S. Pat. No. 5,739,369 (=EP-A-0 738 771) relates to a water-soluble surface treating agent comprising the reaction product of (A) a fluoroalkyl group-containing alkoxysilane with (B) an amino-group-containing alkoxysilane and optionally further with (C) an alkyl group-containing alkoxysilane. The agent is diluted with water to form a solution for treating glass and other substrates to impart thereto properties, such as water repellency.

U.S. Pat. No. 5,919,886 relates to a fluorine-containing organo-silicon compound useful for obtaining elastomers and to room temperature curable silicon compositions containing the same compound.

U.S. Pat. No. 5,306,758 (=EP-A-0 433 070) describes fluorocarbon based, curable, crosslinkable compositions and coatings prepared therefrom that can be used to form low-surface energy release liners.

U.S. Pat. No. 5,922,787 (=EP-0 797 111) and EP 337 474 relate to a composition containing an alkoxy-silane compound having a perfluoropolyether group. The composition may be used for forming an anti-fouling film.

EP 222 157 discloses a hydrolysable silyl group-containing fluoroolefin copolymer that is obtained by polymerizing a monomeric mixture comprising a fluoroolefin such as tetrafluoroethylene and the like in the presence of a hydrolysable silyl group-containing compound. The copolymer is dissolved in an organic solvent and a curing catalyst is added to obtain a low temperature curable resin composition. The composition is intended for use as a paint for household appliances, for buildings, tiles and precoated metals. Similar compositions are described in JP 11 172200.

U.S. Pat. No. 5,527,931 discloses a condensation product of (i) a fluorochemical oligomer having a hydrophilic group such as carboxylic acid groups and a hydrolysable silyl group and (ii) an alkoxysilane. The condensation product is used for rendering a porous substrate more easy to clean and to render it repellent to water and oil.

WO 96/16630 discloses condensation products of an alkoxy silane and a polymer derived from polymerization of a hydrolysable silyl group-containing monomer, acrylic acid and fluorinated monomer for use in dental applications to reduce adhesion of bacteria and proteinaceous substances.

EP 1 054 047, JP 2000 351941, JP 2001 049173 and JP 2001 049181 describe anti-fouling coatings that are based on a fluoropolymer having silyl groups and an organosilane compound such as for example a tetraalkoxysilane.

Despite the many known fluorochemical compositions to provide repellency properties to a substrate, there continues to be a desire to find further compositions that may have improved initial repellency properties and/or that have improved durability, i.e. the repellency properties last longer even under abrading conditions.

Accordingly, it is desirable to provide a coating composition capable of providing a highly durable water, oil and/or stain repellent coating on a substrate. In particular, it is desirable to provide a durable coating wherein the initial, repellent properties are substantially maintained, even under abrading conditions. Further, the coating compositions preferably can be applied and used in an environmental friendly way and can be produced in a reliable, convenient and cost effective way. Desirably, the coatings also display a good durability against cleaning compositions, in particular, the repellency properties are substantially maintained when the coating has been exposed to a cleaning composition as may be used to clean a treated substrate from time to time. Furthermore, it is desirable to obtain optically clear coatings in particular when transparent substrates such as glass are to be treated with the compositions.

3. SUMMARY OF INVENTION

In one aspect, the present invention provides a fluorochemical composition comprising: (a) one or more fluorochemical oligomers derivable from a free radical polymerization of one or more fluorinated monomers and optionally one or more non-fluorinated monomers in the presence of a chain transfer agent, said fluorochemical oligomer being free of acid groups and comprising one or more groups of the formula:

wherein $M^1$ is selected from the group consisting of Si, Ti, Zr, B, Al, Ge, V, Pb, Sn and Zn, R represents a non-hydrolysable group, Y represents a hydrolysable group, q is 0, 1 or 2, p equals the valence of $M^1$ and is 3 or 4 and p−q−1 is at least 1;
(b) one or more non-fluorinated compounds of an element $M^2$ selected from the group consisting of Si, Ti, Zr, B, Al, Ge, V, Pb, Sn and Zn and having at least two hydrolysable groups per molecule in an amount sufficient to form a polycondensation product upon reaction with said fluorochemical oligomer (a);

(c) water; and
(d) an organic solvent in an amount sufficient to dissolve and/or disperse components (a), (b) and (c).

In a further aspect, the present invention provides a composition comprising a condensation product obtainable after a substantially complete condensation reaction of said one or more fluorochemical oligomers and said one or more non-fluorinated compounds. By the term "substantially complete condensation reaction" is meant that the reaction is either complete or at least 80% of the hydrolysable groups in the mixture have disappeared, preferably at least 90%. Completion of the reaction can be monitored through the use of infrared spectroscopy and $C^{13}$-NMR.

In a further aspect, the present invention provides a composition comprising a condensation product obtainable after a partial condensation reaction of said one or more fluorochemical oligomers and said one or more non-fluorinated compounds. By "partial condensation" and "partial condensate" in connection with the present invention is meant that some of the hydrolysable groups in the mixture have reacted while leaving a substantial amount of hydrolysable groups available for a condensation reaction. Typically, a partial condensate means that at least 20%, preferably at least 30%, more preferably at least 50% of the hydrolysable groups are still available for further condensation reaction.

In a still further aspect, the present invention also provides a method for treating a substrate, comprising the step of applying to at least a portion of the surface of the substrate the compositions as defined above. The fluorochemical compositions of the present invention can be used to treat substrates and are capable of rendering such substrates oil and water repellent and/or to provide stain repellency thereto.

The compositions are generally effective at low levels of application and have good durability. The compositions are particularly useful for rendering substrates such as ceramics, glass, inox, chromated steel, wood, textile and leather, repellent to water and/or oil.

The term "hydrolysable group" in connection with the present invention refers to a group which either is directly capable of undergoing condensation reactions under appropriate conditions or which is capable of hydrolyzing under appropriate conditions, thereby yielding a compound, which is capable of undergoing condensation reactions. Appropriate conditions include acidic or basic aqueous conditions, optionally in the presence of another condensation catalyst, such as Sn-compounds.

Accordingly, the term "non-hydrolysable group" as used in the present invention refers to a group not capable of either directly undergoing condensation reactions under appropriate conditions or of hydrolyzing under the conditions listed above for hydrolyzing hydrolyzable groups.

4. DETAILED DESCRIPTION OF ILLUSTRATIVE EMBODIMENTS

Component (a) comprises at least one or more fluorochemical oligomers comprising one or more groups of the formula:

$$-M^1(R)_q(Y)_{p-q-1} \quad (I)$$

wherein $M^1$ is selected from the group consisting of Si, Ti, Zr, B, Al, Ge, V, Pb, Sn and Zn, R represents a non-hydrolysable group, Y represents a hydrolysable group, q is 0, 1 or 2, p is 2, 3 or 4 depending on the valence of $M^1$ and p−q−1 is at least 1.

The hydrolysable groups Y may be the same or different and are generally capable of hydrolyzing under appropriate conditions, for example under acidic or basic aqueous conditions, such that the fluorochemical oligomer can participate in condensation reactions. Preferably, the hydrolysable groups upon hydrolysis yield groups capable of undergoing condensation reactions, such as silanol groups.

Examples of hydrolysable groups include halogens, such as chlorine, bromine, iodine or fluorine, alkoxy groups —OR' (wherein R' represents a lower alkyl group, preferably containing 1 to 6, more preferably 1 to 4 carbon atoms and which may optionally be substituted by one or more halogen atoms), acyloxy groups —O(CO)—R" (wherein R" represents a lower alkyl group, preferably containing 1 to 6, more preferably 1 to 4 carbon atoms and which may optionally be substituted by one or more halogen atoms), aryloxy groups —OR'" (wherein R'" represents an aryl moiety, preferably containing 6 to 12, more preferably containing 6 to 10 carbon atoms, which may be optionally substituted by one or more substituents independently selected from halogens, and $C_1$-$C_4$ alkyl groups which may optionally be substituted by one or more halogen atoms). In the above formulae R', R", and R'" may include linear, branched and/or cyclic structures.

Suitable hydrolysable groups OR' also include polyoxyalkylene groups. An oxyalkylene unit in the poly(oxyalkylene) group preferably has 2 or 3 carbon atoms, such as —OCH$_2$—CH$_2$—, —OCH$_2$—CH$_2$—CH$_2$—, and —OCH(CH$_3$)CH$_2$—. The oxyalkylene units in the poly(oxyalkylene) group can be the same, as in poly(oxyethylene), or present as a mixture, as in straight or branched chain or randomly distributed oxyethylene and oxypropylene units or as in a straight chain of blocks of oxyethylene units and blocks of oxypropylene units. Particularly preferred poly(oxyalkylene) groups are polyoxyethylene and alkoxypolyoxyethylenes that have a molecular weight up to about 15000. The number of oxyalkylene units in a poly(oxyalkylene) is between 2 and 120, preferably between 2 to 40, more preferably between 2 and 10.

Specific examples of hydrolysable groups include methoxy, ethoxy and propoxy group, chlorine, acetoxy group and polyoxyethylene. Particularly preferred hydrolysable groups include $C_1$-$C_4$ alkoxy groups, such as methoxy and ethoxy groups and poly(oxyalkylene) groups, such as triethyleneglycol monomethylether.

Examples of fluorinated monomers for the preparation of the fluorochemical oligomer include those that can be represented by general formula:

$$R_f\text{—}X\text{-}E \quad (II)$$

wherein $R_f$ represents a partially or fully fluorinated aliphatic group having at least 3 carbon atoms or a partially or fully fluorinated polyether group, X represents an organic divalent linking group and E represents ethylenically unsaturated group. The ethylenically unsaturated group E can be fluorinated or non-fluorinated.

The fluoroaliphatic group $R_f$ in the fluorochemical monomer can be a fluorinated, stable, inert, preferably saturated, non-polar, monovalent aliphatic radical. It can be straight chain, branched chain, or cyclic or combinations thereof. It can contain heteroatoms such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least 3 and up to 18 carbon atoms, preferably 3 to 14, especially 4 to 10 carbon atoms, and preferably contains about 40% to about 80% fluorine by weight, more preferably about 50% to about 79% fluorine by weight. The terminal portion of the $R_f$ radical is a perfluorinated moiety, which will preferably contain at least 7 fluorine atoms, e.g., $CF_3CF_2CF_2-$, $(CF_3)_2CF-$, $F_5SCF_2-$. The preferred $R_f$ radicals are fully or substantially fluorinated and are preferably those perfluorinated aliphatic radicals of the formula $C_nF_{2n+1}-$ where n is 3 to 18, particularly 4 to 10. Compounds wherein the $R_f$ radical is a $C_4F_9-$ are generally more environmentally friendly than compounds where the $R_f$ radical consists of a perfluorinated group with more carbon atoms. Surprisingly, despite the short $C_4$ perfluorinated group, the fluorochemical oligomeric compounds prepared therewith are highly effective.

The $R_f$ group can also be a (per)fluoropolyether group. The perfluoropolyether group $R_f$ can include linear, branched, and/or cyclic structures, that may be saturated or unsaturated, and substituted with one or more oxygen atoms. It is preferably a perfluorinated group (i.e., all C—H bonds are replaced by C—F bonds). More preferably, it includes perfluorinated repeating units selected from the group of $-(C_nF_{2n})-$, $-(C_nF_{2n}O)-$, $-(CF(Z))-$, $-(CF(Z)O)-$, $-(CF(Z)C_nF_{2n}O)-$, $-(C_nF_{2n}CF(Z)O)-$, $-(CF_2CF(Z)O)-$, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. The terminal groups can be $(C_nF_{2n+1})-$, $(C_nF_{2n+1}O)-$ or $(X'C_nF_{2n}O)-$, wherein X' is H, Cl, or Br, for example. Preferably, these terminal groups are perfluorinated. In these repeating units or terminal groups, n is 1 or more, and preferably about 1 to about 4. Particularly preferred approximate average structures for a perfluoropolyether group include $C_3F_7O(CF(CF_3)CF_2O)_pCF(CF_3)-$ and $CF_3O(C_2F_4O)_pCF_2-$ wherein an average value for p is 1 to about 50. As synthesized, these compounds typically include a mixture of polymers. The approximate average structure is the approximate average of the mixture of polymers.

In a particular embodiment of this invention, the fluorochemical oligomer of the composition contains units derived from fluorinated monomers according to above formula (II) wherein $R_f$ represents a perfluorinated polyether moiety, e.g. of the formula $C_3F_7O(CF(CF_3)CF_2O)_pCF(CF_3)-$, having a molecular weight of at least 750 g/mol, for example between 750 g/mol and 5000 g/mol, preferably between 750 g/mol and 2500 g/mol. The fluorochemical oligomer may contain one or more units derived from fluorinated monomers having perfluorinated polyether moieties and these polyether moieties may have the same or different molecular weights and/or may differ in their structure. Also, the composition may contain a mixture of fluorochemical oligomers having units derived from fluorinated monomers having perfluorinated polyether moieties of different structure and/or molecular weight. Preferably a major part or all of the perfluorinated polyether moieties in the fluorochemical oligomer or mixture of fluorochemical oligomers have a molecular weight of at least 750 g/mol. Preferably not more than 10%, more preferably not more than 5% by weight and most preferably not more than 1% by weight of the perfluorinated polyether moieties in the fluorochemical oligomer or mixture of fluorochemical oligomers have a molecular weight of less than 750 g/mol. Such composition have been found to have beneficial environmental characteristics and provide good repellency properties.

The linking group X in the above formula (II) links the fluoroaliphatic or the fluorinated polyether group $R_f$ to the free radical polymerizable group E, and is a generally non-fluorinated organic linking groups. The linking group can be a chemical bond, but preferably contains from 1 to about 20 carbon atoms and may optionally contain oxygen, nitrogen, or sulfur-containing groups or a combination thereof. The linking group is preferably free of functional groups that substantially interfere with free-radical oligomerization (e.g., polymerizable olefinic double bonds, thiols, and other such functionality known to those skilled in the art). Examples of suitable organic divalent linking groups include:

\*—COQ'—R$^1$-Q''—CO—, \*—COO—CH$_2$—CH(OH)—R$^1$-Q'—CO—, \*-L$^1$-Q'—CONH-L$^2$-, \*—R$^1$-Q'—CO—\* —COQ'—R$^1$—, —R$^1$—, \*—COQ'—R$^1$-Q'-, \* —SO$_2$NR$^a$—R$^1$-Q'-,\*—SO$_2$NR$^a$—R$^1$— and

\* —SO$_2$NR$^a$—R$^1$-Q'-CO—, wherein Q' and Q'' independently represent O or NR$^a$, R$^a$ is hydrogen or an alkyl group of 1 to 4 carbon atoms, R$^1$ represents a linear, cyclic or branched alkylene group that may be interrupted by one or more heteroatoms such as O or N, L$^1$ and L$^2$ represent each independently represent a non-fluorinated organic divalent linking group including for example an alkylene group, a carbonyl group, a carbonamido alkylene group and/or carboxy alkylene group, and \* indicates the position where the linking group is attached to the group $R_f$ in formula (II).

Fluorochemical monomers $R_f$—X-E as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976.

Perfluoropolyetheracrylates or methacrylates are described in U.S. Pat. No. 4,085,137.

Preferred examples of fluorochemical monomers include:

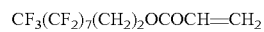

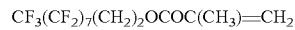

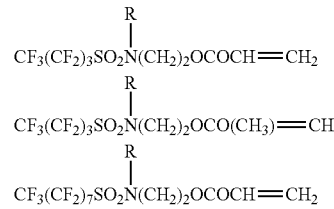

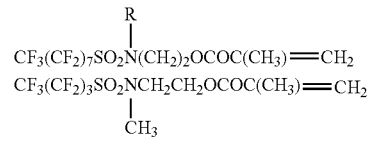

-continued $$CF_3(CF_2)_3SO_2NCH_2CH_2OCOCH=CH_2$$
$$|$$
$$CH_3$$

$$CF_3(CF_2)_7CH_2CH_2SO_2NCH_2CH_2OCOC(CH_3)=CH_2$$
$$|$$
$$CH_3$$

$$CF_3O(CF_2CF_2)_uCH_2OCOCH=CH_2$$

$$CF_3O(CF_2CF_2)_uCH_2OCOC(CH_3)=CH_2$$

$$C_3F_7O(CF(CF_3)CF_2O)_uCF(CF_3)CH_2OCOCH=CH_2$$

$$C_3F_7O(CF(CF_3)CF_2O)_uCF(CF_3)CH_2OCOC(CH_3)=CH_2$$

$$C_3F_7O(CF(CF_3)CF_2O)_uCF(CF_3)$$
$$CONHCH_2CH_2OCOC(CH_3)=CH_2$$

$$C_3F_7O(CF(CF_3)CF_2O)_uCF(CF_3)$$
$$CONHCH_2CH_2OCOCH=CH_2$$

$$CF_3CF_2CF_2CF_2O[CF(CF_3)CF_2O]_vCF(CF_3)CH_2OC$$
$$(O)CH=CH_2 \text{ (v average 1.5)}$$

wherein R represents methyl, ethyl or n-butyl and u is about 1 to 25.

In a preferred embodiment, component a) comprises a fluorochemical oligomer that can be represented by the general formula:

$$A\text{-}M^f_n M^h_m M^a_r\text{-}G \qquad (III)$$

wherein A represents hydrogen or the residue of an initiating species, e.g. an organic compound having a radical and that derives from the decomposition of a free radical initiator or that derives from a chain transfer agent;

$M^f$ represents units derived from one or more fluorinated monomers as described above;

$M^h$ represents units derived from one or more non-fluorinated monomers;

$M^a$ represents units having a silyl group represented by the formula:

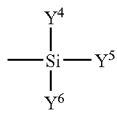

(IV)

wherein each of $Y^4$, $Y^5$ and $Y^6$ independently represents an alkyl group, an aryl group or a hydrolyzable group as defined above;

G is a monovalent organic group comprising the residue of a chain transfer agent, with the proviso that at least one of the following conditions is fulfilled: (a) G contains a silyl group of the formula:

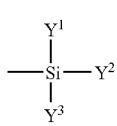

(V)

wherein $Y^1$, $Y^2$ and $Y^3$ each independently represents an alkyl group, an aryl group or a hydrolyzable group and at least one of $Y^1$, $Y^2$ and $Y^3$ represent a hydrolysable group, or (b) r is at least 1 and at least one of $Y^4$, $Y^5$ and $Y^6$ represents a hydrolyzable group.

The total number of units represented by the sum of n, m and r is generally at least 2 and preferably at least 3 so as to render the compound oligomeric. The value of n in the fluorochemical oligomer is between 1 and 100 and preferably between 2 and 20. The values of m and r are between 0 and 100 and preferably between 1 and 30. According to a preferred embodiment, the value of m is less than that of n and n+m+r is at least 2.

The fluorochemical oligomers typically have an average molecular weight between 400 and 100000, preferably between 600 and 20000. The fluorochemical oligomer preferably contains at least 10 mole % (based on total moles of units $M^f$, $M^h$ and $M^a$) of hydrolysable groups.

It will further be appreciated by one skilled in the art that the preparation of fluorochemical oligomers useful in the present invention results in a mixture of compounds and accordingly, general formula III should be understood as representing a mixture of compounds whereby the indices n, m and r in formula III represent the molar amounts of the corresponding unit in such mixture. Accordingly, it will be clear that n, m and r can be fractional values.

The units $M^h$ of the fluorochemical oligomer (when present) are generally derived from a non-fluorinated monomer, preferably a monomer consisting of a polymerizable group and a hydrocarbon moiety. Hydrocarbon group containing monomers are well known and generally commercially available. Examples of hydrocarbon containing monomers include those according to formula:

$$R^h\text{—}X^1\text{-}E^1 \qquad (VI)$$

wherein $R^h$ represents a hydrocarbon group, $X^1$ represents a chemical bond or a divalent linking group and $E^1$ is an ethylenically unsaturated group. Examples of linking groups $X^1$ include oxy, carbonyl, carbonyloxy, carbonamido, sulphonamido, oxyalkylene and poly(oxyalkylene) or any of the linking groups listed above for X in formula (II) The hydrocarbon group is preferably selected from the group consisting of a linear, branched or cyclic alkyl group, an aralkyl group, an alkylaryl group and an aryl group. Further non-fluorinated monomers include those wherein the hydrocarbon group in formula (VI) includes oxyalkylene groups or contains substituents, such as hydroxy groups, amino groups, epoxy groups, halogens such as chlorine and bromine.

Examples of non-fluorinated monomers from which the units $M^h$ can be derived include general classes of ethylenic compounds capable of free-radical polymerization, such as, for example, allyl esters such as allyl acetate and allyl heptanoate; alkyl vinyl ethers or alkyl allyl ethers, cetyl vinyl ether, dodecylvinyl ether, 2-chloroethylvinyl ether, ethylvinyl ether; anhydrides and esters of unsaturated acids such as acrylic acid, methacrylic acid, alpha-chloro acrylic acid, crotonic acid, maleic acid, fumaric acid or itaconic acid, for example vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylchloride and vinylidene chloride.

The fluorochemical oligomer useful in the invention generally further includes units $M^a$ that have a silyl group that has one or more hydrolysable groups. Examples of units $M^a$ include those that correspond to the general formula:

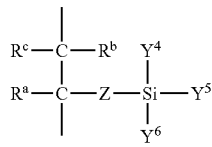

(VIII)

wherein $R^a$, $R^b$ and $R^c$ each independently represents hydrogen, an alkyl group such as for example methyl or ethyl, halogen or an aryl group, Z represents a chemical bond or an organic divalent linking group and $Y^4$, $Y^5$ and $Y^6$ independently represents an alkyl group, an aryl group, or a hydrolysable group as defined above.

Such units $M^a$ may be derived from a monomer represented by the formula:

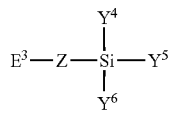

(IX)

wherein each of $Y^4$, $Y^5$ and $Y^6$ independently represents an alkyl group, an aryl group, or a hydrolysable group; Z represents a chemical bond or an organic divalent linking group and $E^3$ represents an ethylenically unsaturated group. Alternatively such units $M^a$ according to formula VIII can be obtained by reacting a functionalized monomer with a silyl group containing reagent as will be described furtheron. By the term "functionalised monomer" is meant a monomer that has one or more groups available for subsequent reaction, for example a group capable of undergoing a condensation reaction. Typically, the functionalised monomer is a monomer that has one or more groups capable of reacting with an isocyanate or epoxy groups. Specific examples of such groups include hydroxy and amino groups.

In the above formulas (VIII) and (IX) Z may represent an organic divalent linking group that preferably contains from 1 to about 20 carbon atoms. Z can optionally contain oxygen, nitrogen, or sulfur-containing groups or a combination thereof, and Z is preferably free of functional groups that substantially interfere with free-radical oligomerization (e.g., polymerizable olefinic double bonds, thiols, and other such functionality known to those skilled in the art). Examples of suitable linking groups Z include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof. Preferred linking groups are selected from the group consisting of alkylene, oxyalkylene and carbonyloxyalkylene. According to a particular embodiment, the linking group Z may be represented by formula:

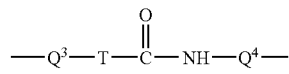

wherein $Q^3$ and $Q^4$ independently represents an organic divalent linking group. Examples of organic divalent linking groups $Q^3$ include for example an alkylene, an arylene, oxyalkylene, carbonyloxyalkylene, oxycarboxyalkylene, carboxyamidoalkylene, urethanylenealkylene and ureylenealkylene. Examples of organic divalent linking groups $Q^4$ include for example alkylene and arylene. T represents O or NR wherein R represents hydrogen, a $C_1$-$C_4$ alkyl group or an aryl group.

Examples of monomers according to formula IX include vinyltrichlorosilane, vinyltrimethoxysilane, vinyltriethoxysilane and alkoxysilane functionalised acrylates or methacrylates, such as methacryloyloxypropyl trimethoxysilane.

The fluorochemical oligomer is conveniently prepared through a free radical polymerization of a fluorinated monomer with optionally a non-fluorinated monomer and a monomer containing the silyl group in the presence of a chain transfer agent. A free radical initiator is generally used to initiate the polymerization or oligomerization reaction. Commonly known free-radical initiators can be used and examples thereof include azo compounds, such as azobisisobutyronitrile (AIBN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The oligomerization reaction can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™ 113, trichloroethylene, α,α,α-trifluorotoluene, and the like, and mixtures thereof.

The oligomerization reaction can be carried out at any temperature suitable for conducting an organic free-radical reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 200° C.

The fluorochemical oligomer is typically prepared in the presence of a chain transfer agent. Suitable chain transfer agents may include a hydroxy-, amino-, mercapto or halogen group. The chain transfer agent may include two or more of such hydroxy, amino-, mercapto or halogen groups. Typical chain transfer agents useful in the preparation of the fluorochemical oligomer include those selected from 2-mercaptoethanol, 3-mercapto-2-butanol, 3-mercapto-2-propanol, 3-mercapto-1-propanol, 3-mercapto-1,2-propanediol, 2-mercapto-ethylamine, di(2-mercaptoethyl)sulfide, octylmercaptane and dodecylmercaptane.

In a preferred embodiment a chain transfer agent containing a silyl group having one or more hydrolyzable groups is used in the oligomerization to produce the fluorochemical oligomer. Chain transfer agents including such a silyl group include those according to formula X.

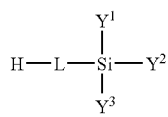

(X)

wherein $Y^1$, $Y^2$ and $Y^3$ each independently represents an alkyl group, preferably a $C_1$-$C_8$ alkyl group such as methyl, ethyl or propyl or an alkyl group containing a cycloalkyl such as cyclohexyl or cylcopentyl, an aryl group such as phenyl, an alkylaryl group or an aralkyl group, a hydrolysable group such as for example halogen or alkoxy group such as methoxy, ethoxy or aryloxy group, with at least one of $Y^1$, $Y^2$ and $Y^3$ representing a hydrolysable group. L represents a divalent linking group.

Preferred chain transfer agents are those in which L represents $—S-Q^1-$, $—O-Q^1-$ or $—NR-Q^1-$ with R representing H or an alkyl group of 1 to 4 carbon atoms and wherein $Q^1$ is linked to the silicone atom in formula X. $Q^1$ represents an organic divalent linking group such as for example a straight chain, branched chain or cyclic alkylene, arylene or aralkylene. The use of chain transfer agent wherein L is $—S-Q^1-$, will generally result in fluorochemical oligomers in which the monovalent organic group G corresponds to the following formula:

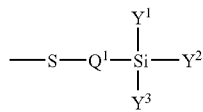

wherein $Y^1$, $Y^2$, $Y^3$ and $Q^1$ have the meaning as defined above.

A single chain transfer agent or a mixture of different chain transfer agents may be used. The preferred chain transfer agents are 2-mercaptoethanol, octylmercaptane and 3-mercaptopropyltrimethoxysilane. A chain transfer agent is typically present in an amount sufficient to control the number of polymerized monomer units in the oligomer and to obtain the desired molecular weight of the oligomeric fluorochemical silane. The chain transfer agent is generally used in an amount of about 0.05 to about 0.5 equivalents, preferably about 0.25 equivalents, per equivalent of monomer including fluorinated and non-fluorinated monomers.

The fluorochemical oligomer useful in the present invention contains one or more hydrolyzable groups. These hydrolysable groups may be introduced in the fluorochemical oligomer by oligomerising in the presence of a chain transfer agent having a silyl group containing one or more hydrolysable groups, for example a chain transfer agent according to formula X above wherein at least one of $Y^1$, $Y^2$ and $Y^3$ represents a hydrolysable group and/or by co-oligomerising with a monomer containing a silyl group having one or more hydrolysable groups such as a monomer according to formula IX above wherein at least one of $Y^4$, $Y^5$ and $Y^6$ represents a hydrolysable group. Alternatively, a functionalised chain transfer agent or functionalised comonomer can be used which can be reacted with a silyl group containing reagent subsequent to the oligomerization.

Thus, according to a first embodiment a fluorochemical oligomer is prepared by oligomerizing a fluorinated monomer and optional non-fluorinated monomer with a monomer according to formula IX above wherein at least one of $Y^4$, $Y^5$ and $Y^6$ represents a hydrolysable group in the presence of a chain transfer agent which may optionally also contain a silyl group such as for example a chain transfer agent according to formula X above wherein at least one of $Y^1$, $Y^2$ and $Y^3$ represents a hydrolysable group.

As a variation to the above method the oligomerization may be carried out without the use of the silyl group containing monomer but with a chain transfer agent containing the silyl group.

A further embodiment for producing the fluorochemical oligomer, involves the polymerisation or oligomerisation of one or more fluorinated monomers and optional non-fluorinated monomer and a functionalised monomer in the presence of a chain transfer agent. Examples of such monomers include hydroxy or amino functionalised acrylate or methacrylates, such as 2-hydroxyethyl(meth)acrylate, 3-hydroxypropyl(meth)acrylate, 6-hydroxyhexyl(meth)acrylate and the like. Alternative to or in addition to the use of functionalised monomer, a functionalised chain transfer agent can be used. By the term "functionalised chain transfer agent" is meant a chain transfer agent that has one or more groups available for subsequent reaction, for example a group capable of undergoing a condensation reaction. Typically, the functionalised chain transfer agent is a chain transfer agent that has one or more groups capable of reacting with an isocyanate or epoxy group. Specific examples of such groups include hydroxy and amino groups. Examples of such chain transfer agents include 2-mercaptoethanol, 3-mercapto-2-butanol, 3-mercapto-2-propanol, 3-mercapto-1-propanol and 3-mercapto-1,2-propanediol and 2-mercapto-ethylamine. Subsequent to the oligomerisation the functional group contained in the comonomer and/or chain transfer agent can be reacted with a compound including a silyl group having hydrolysable groups and that is capable of reacting with the functional group contained in the comonomer and/or chain transfer agent.

Suitable compounds for reacting with the functional groups included in the monomer or chain transfer agent include compounds according to the following formula:

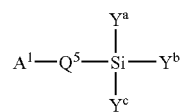

(XI)

wherein $A^1$ represents a functional group capable of undergoing a condensation reaction with the functional group contained in the monomer or chain transfer agent, in particular a functional group capable of condensing with a hydroxy or amino functional oligomer, examples of $A^1$ include an isocyanate or an epoxy group; $Q^5$ represents an organic divalent linking group; $Y^a$, $Y^b$ and $Y^c$ each independently represents an alkyl group, preferably a $C_1$-$C_8$ alkyl group such as methyl, ethyl or propyl or an alkyl group containing a cycloalkyl such as cyclohexyl or cylcopentyl, an aryl group such as phenyl, an alkylaryl group or an aralkyl group or hydrolysable group such as any of the hydrolysable groups mentioned above for the hydrolysable groups Y of formula (I) and at least one of $Y^a$, $Y^b$ and $Y^c$ represents a hydrolysable group.

The organic divalent linking group $Q^5$ preferably contains from 1 to about 20 carbon atoms. $Q^5$ can optionally contain oxygen, nitrogen, or sulfur-containing groups or a combination thereof. Examples of suitable linking groups $Q^5$ include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof. Preferred linking groups are selected from the group consisting of alkylene, oxyalkylene and carbonyloxyalkylene.

Examples of compounds according to formula XI include 3-isocyanatopropyltriethoxysilane and 3-epoxypropyltrimethoxysilane. When a hydroxy or amino functionalised chain transfer agent is used that is subsequently reacted with a compound according to formula XI wherein $A^1$ is an isocyanato group, the resulting monovalent organic group G in the fluorochemical compound can generally be represented by the formula:

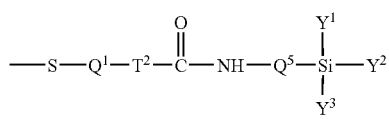

wherein $Q^1$, $Q^5$, $Y^1$, $Y^2$ and $Y^3$ have the meaning as defined above and $T^2$ represents O or NR with R being hydrogen, an aryl or a $C_1$-$C_4$ alkyl group.

The condensation reaction is carried out under conventional conditions well-known to those skilled in the art. Preferably the reaction is run in the presence of a catalyst. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 percent to about 10 percent, preferably about 0.1 percent to about 5 percent, by weight based on the total weight of the reactants.

The condensation reaction is preferably carried out under dry conditions in a polar solvent such as ethyl acetate, acetone, methyl isobutyl ketone, toluene and the like. Suitable reaction temperatures will be easily determined by those skilled in the art based on the particular reagents, solvents, and catalysts being used. Suitable temperatures are between about room temperature and about 120 deg. C.

Component (b) used in the present invention comprises one or more non-fluorinated compounds of an element $M^2$ selected from the group consisting of Si, Ti, Zr, B, Al, Ge, V, Pb, Sn and Zn having at least two hydrolysable groups per molecule. Preferably, the hydrolysable groups are directly bonded to the element $M^2$.

In one embodiment of the present invention, component (b) comprises a compound according to the formula (VII)

$(R^2)_iM^2(Y^7)_{j-i}$ (VII)

wherein $R^2$ represents a non-hydrolysable group, $M^2$ represents an element selected from the group consisting of Si, Ti, Zr, B, Al, Ge, V, Pb, Sn and Zn, j is 3 or 4 depending on the valence of $M^2$, i is 0, 1 or 2, and $Y^7$ represents a hydrolysable group.

The hydrolysable groups present in component (b) may be the same or different and are generally capable of hydrolyzing under appropriate conditions, for example under acidic or basic aqueous conditions, such that component (b) can undergo condensation reactions. Preferably, the hydrolysable groups upon hydrolysis yield groups capable of undergoing condensation reactions, such as hydroxyl groups.

Typical and preferred examples of hydrolysable groups include those as described with respect to component (a). Preferably, component (b) includes tetra-, tri- or dialkoxy (preferably containing 1 to 4 carbon atoms) compounds.

The non-hydrolysable groups $R^2$ may be the same or different and are generally not capable of hydrolyzing under the conditions listed above. For example, the non-hydrolysable groups $R^2$ may be independently selected from a hydrocarbon group, for example a $C_1$-$C_{30}$ alkyl group, which may be straight chained or branched and may include one or more aliphatic, cyclic hydrocarbon structures, a $C_6$-$C_{30}$ aryl group (optionally substituted by one or more substituents selected from halogens and $C_1$-$C_4$ alkyl groups), or a $C_7$-$C_{30}$ aralkyl group.

In one embodiment the non-hydrolysable groups $R^2$ are independently selected from a hydrocarbon group, for example a $C_1$-$C_{30}$ alkyl group and a $C_6$-$C_{20}$ aryl group (optionally substituted by one or more substituents selected from halogens and $C_1$-$C_4$ alkyl groups).

Preferred compounds (b) include those in which M is Ti, Zr, Si and Al. Representative examples of component (b) include tetramethoxysilane, tetra ethoxysilane, methyl triethoxysilane, dimethyldiethoxysilane, octadecyltriethoxysilane, methyl trichlorosilane, tetra-methyl orthotitanate, tetra ethyl orthotitanate, tetra-iso-propyl orthotitanate, tetra-n-propyl orthotitanate, tetraethyl zirconate, tetra-iso-propyl zirconate tetra-n-propyl zirconate and the like. More preferred compounds include $C_1$-$C_4$ alkoxy derivatives of Si, Ti and Zr. Particularly preferred compounds (b) include tetraethoxysilane. Single compounds or mixtures of compounds (b) may be used.

Optionally, the composition may comprise one or more crosslinking agents, in addition to the fluorochemical oligomer (a) and the non-fluorinated compound (b); in order to further increase the durability of the coating. The crosslinking agent may be selected from compounds with additional functionality from those of components (a) and (b). For example, the crosslinking agent may comprise a compound of an element $M^3$ that is selected from the group consisting of Si, Ti, Zr, B, Al, Ge, V, Pb, Sn and Zn having at least one hydrolysable group and at least one reactive functional group per molecule that is capable of engaging in a crosslinking reaction. Preferably, said at least one hydrolysable group is directly bonded to the element $M^3$.

Suitable and preferred hydrolysable groups include those groups mentioned with respect to components (a) and (b). If the crosslinking agent includes more than one hydrolysable groups, these may be the same or different. Particularly preferred hydrolysable groups are selected from $C_1$-$C_4$ alkoxy groups, such as methoxy, ethoxy, iso- and (preferably) n-propoxy, or iso- and (preferably) n-butoxy groups.

The reactive functional group is a group which is capable of engaging in a crosslinking reaction so as to provide further crosslinking functionality to the polycondensation product that can be obtained from components (a) and (b). The crosslinking reaction may involve for example irradiation, heating or a combination thereof. If the crosslinking agent includes more than one reactive functional groups, these groups may be the same or different. Of these, free radically polymerizable groups, such as vinyl, acrylate or methacrylate groups, are particularly preferred reactive functional groups.

A preferred crosslinking agent can be represented by formula (XII):

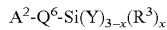

wherein $A^2$ represents a reactive functional group that may react by condensation or addition reactions such as an amino group, an epoxy group, a mercaptan or an anhydride group or by free-radical polymerization; $Q^6$ represents an organic divalent linking group, Y represents a hydrolysable group and $R^3$ represents a $C_1$-$C_8$ alkyl group. x is 0, 1 or 2. Preferably $Q^6$ is an alkylene (preferably containing 1 to 10, more preferably containing 1 to 6 carbon atoms), an arylene (preferably containing 6 to 20 carbon atoms which may be substituted by one or more $C_1$-$C_4$ alkyl groups, halogen atoms or mixtures thereof), an oxyalkylene group of the formula (—O—R'—)$_n$, wherein R' is independently selected from a divalent, straight chained or branched lower alkyl group (preferably containing 1 to 6 carbon atoms) and n is an integer from 1 to 20. Preferably $R^3$ independently represents an alkyl group, preferably a $C_1$-$C_8$ alkyl group (such as methyl, ethyl or propyl) or an $C_1$-$C_8$ alkyl group containing a cyclic hydrocarbon structure (such as cycloalkyl such as cyclohexyl or cyclopentyl), an aryl group (preferably containing 6 to 20 carbon atoms which may optionally be substituted by one or more $C_1$-$C_4$ alkyl groups or halogens or mixtures thereof, such as phenyl), an alkylaryl group (preferably containing 7 to 12 carbon atoms) or an aralkyl group (preferably containing 7 to 12 carbon atoms).

Y is hydrolysable group. Suitable and preferred examples of hydrolysable groups include those groups as mentioned with respect to components (a) and (b). Particularly preferred hydrolysable groups include alkoxy groups (preferably containing 1 to 4 carbon atoms), such as methoxy and ethoxy groups.

Particularly preferred reactive compounds according to formula (XII), in which the reactive functional group $A^2$ is one that reacts by addition or condensation reactions, include epoxypropyltrimethoxysilane, bis(3-aminopropyltrimethoxysilyl)amine and aminopropyltrimethoxysilane.

Alternatively $A^2$ may be a reactive functional group that is a free radically polymerizable group that typically contains an ethylenically unsaturated group capable of undergoing a free radical polymerization. Suitable free radically polymerizable groups $A^2$ include, for example, moieties derived from vinyl ethers, vinyl esters, allyl esters, vinyl ketones, styrene, vinyl amide, acrylamides, maleates, fumarates, acrylates and methacrylates. Of these, the esters and amides of alpha, beta unsaturated acids, such as the acrylates and methacrylates are preferred.

Where $A^2$ is a free radically polymerizable group the organic divalent linking group $Q^6$ may contain from 1 to about 20, preferably from 1 to 10 carbon atoms. $Q^6$ can optionally contain oxygen, nitrogen, or sulfur-containing groups or a combination thereof. Examples of suitable linking groups $Q^6$ include straight chain, branched chain or cyclic alkylene (preferably containing 2 to 20 carbon atoms), arylene (preferably containing 6 to 20 carbon atoms), aralkylene (preferably containing 7 to 20 carbon atoms), oxyalkylene, carbonyloxyalkylene, oxycarboxyalkylene, carboxyamidoalkylene, urethanylenealkylene, ureylenealkylene and combinations thereof.

Preferred linking groups $Q^6$ for Formula XII are selected from the group consisting of alkylene (preferably containing 2 to 20, more preferably 2 to 10 carbon atoms), oxyalkylene (preferably containing 2 to 20 carbon atoms and 1 to 10 oxygen atoms) and carbonyloxyalkylene (preferably containing 3 to 20 carbon atoms).

Examples of compounds according to formula (XII), wherein $A^2$ is a free radically polymerizable group include vinyltrichlorosilane, vinyltrimethoxysilane, vinyltriethoxysilane and alkoxysilane functionalised acrylates or methacrylates, such as methacryloyloxypropyl trimethoxysilane.

The presence of such reactive functional groups, preferably reactive unsaturated groups in the corresponding polycondensates is advantageous in that following the coating of the composition onto a substrate a two-fold curing can be carried out, i.e. a thermal or photochemically induced linking of the unsaturated organic radicals through radical polymerization and a thermal completion of the polycondensation (e.g. by elimination of water from groups M-OH still present). In the case an unsaturated compound is used, additionally a catalyst should typically be present for the thermal and/or photochemically induced curing of the coating composition applied onto a suitable substrate. Particularly preferred is the addition of a photopolymerization initiator. Such initiators are commercially available and include e.g. Irgacure® 184 (1-hydroxycyclohexyl phenyl ketone), Irgacure®500 (1-hydroxycyclohexyl phenyl ketone, benzophenone), and other photo-initiators of the Irgacure®-type available from Ciba-Geigy; Darocur®-type photo-initiators, available from Merck, benzophenone and the like.

Examples of optionally employed thermal initiators are known to those skilled in the art and include, among others, organic peroxides in the form of diacyl peroxides, peroxydicarbonates, alkyl peresters, dialkyl peroxides, perketals, ketone peroxides and alkyl hydroperoxides. Specific examples of such thermal initiators are dibenzoyl peroxide, tert-butyl perbenzoate and azobisisobutyronitrile.

These initiators are added to the coating composition in amounts known to one skilled in the art. Typically the initiator will be added in an amount between 0.1 and 2% by weight, based on the amount of crosslinking agent.

The compositions may further contain additives that provide the coating with additional properties, such as antimicrobial properties. Examples include $[C_{18}H_{37}N(CH_3)_2(CH_2)_3\ Si(OCH_3)_3]^+Cl^-$. However, the addition of ionic additives is preferably kept below about 10% by weight, in order not to adversely affect the water repellency properties of the composition.

The reaction product comprised in the composition of the present invention is obtainable by reacting components (a), (b) and optional crosslinking agent. Typically, the reaction product is a partial condensate or alternatively a substantial complete polycondensation product is formed.

The polycondensation reaction is conveniently carried out by mixing the starting components in an organic solvent preferably at room temperature, in the presence of sufficient water to effect hydrolysis of the hydrolysable groups. Preferably, the amount of water will be between 0.1 and 20% by weight of the total composition, more preferably between 1 and 10% by weight. In addition to water, an organic or inorganic acid or base catalyst should preferably be used.

Organic acid catalysts include acetic acid, citric acid, formic acid, triflic acid, perfluorobutyric acid and the like.

Examples of inorganic acids include sulphuric acid, hydrochloric acid and the like. Examples of useful base catalysts include sodium hydroxide, potassium hydroxide and triethylamine. The acid or base catalyst will generally be used in amounts between about 0.01 and 10%, more preferably between 0.05 and 5% by weight of the total composition.

The weight ratio of compounds (a) to compounds (b) in the preparation of the reaction product may vary widely and is typically between 2:1 and 1:100. In one particular embodiment the weight ratio of compounds (a) to compounds (b) is from 2:1 to 1:20 or from 1:1 to 1:10. In another embodiment, the weight ratio of compounds (a) to compounds (b) is between 1:30 and 1:100. The latter embodiment is particularly useful when the fluorochemical oligomer comprises units derived from fluorinated monomers according to formula (II) above in which $R_f$ represents a perfluoroaliphatic group having 4 carbon atoms. It has been found that with such composition, a very low amount of fluorochemical product can be used to achieve good repellency properties. Such compositions not only provide an environmental advantage but also provide a cost advantage. Typically the amount of component (a) is between 0.05 and 10% by weight and the amount of component (b) is between 0.05 and 20% by weight of the components used. The crosslinking agent can be used between 0 and 50%, preferably between 0 and 35% by weight, based on the total weight of the components used.

The composition of the present invention may include one or more organic solvents. The organic solvent or blend of organic solvents used must be capable of dissolving a mixture of compounds (a), (b) and optional crosslinking agent and the fluorinated condensate formed after reaction. Preferably, the organic solvent or blend of organic solvents used is capable of dissolving at least 0.01% of the fluorochemical condensate. Furthermore, the solvent or mixture of solvents preferably has a solubility for water of at least 0.1%, preferably 1% by weight and a solubility for the acid or base catalyst of at least 0.01%, preferably 0.1% by weight. If the organic solvent or mixture of organic solvents do not meet these criteria, it may not be possible to obtain a homogeneous mixture of the fluorinated condensate, solvent(s), water and catalyst.

Suitable organic solvents, or mixtures of solvents can be selected from aliphatic alcohols (preferably containing 1 to 6 carbon atoms), such as methanol, ethanol, isopropylalcohol; ketones such as acetone or methyl ethyl ketone; esters, such as ethyl acetate, methylformate and ethers, such as diethyl ether. Particularly preferred solvents include ethanol and acetone.

Fluorinated solvents may be used in combination with the organic solvents in order to improve solubility of the starting compounds and/or the fluorochemical condensate. Such fluorinated solvents will generally not be suitable for use on their own because they will generally not meet the requirements of solubility for water and acid or base unless they additionally contain hydrophilic groups such as $CF_3CH_2OH$.

Examples of fluorinated solvents include fluorinated hydrocarbons, such as perfluorohexane or perfluorooctane, available from 3M; partially fluorinated hydrocarbons, such as pentafluorobutane, available from Solvay, or $CF_3CFHCFHCF_2CF_3$, available from DuPont; hydrofluoroethers, such as methyl perfluorobutyl ether or ethyl perfluorobutyl ether, available from 3M. Various blends of these materials with organic solvents can be used.

It will further be appreciated by one skilled in the art that the preparation of fluorochemical condensates according to the present invention results in a mixture of compounds. A condensation sequence is described by Arkles (CHEMTECH (1977), v. 7 pp 766-78).

The composition of the present invention, comprising the components (a), (b) and optional crosslinking agent, and/or the partial or complete polycondensation products thereof, is generally applied to the substrate in amounts sufficient to produce a coating that is water and oil repellent. This coating can be extremely thin, e.g. 1 to 50 molecular layers, though in practice a useful coating may be thicker.

Suitable substrates that can be treated in a particularly effective way with the fluorochemical composition, comprising the fluorochemical condensate mixture, of this invention include substrates having a hard surface that preferably has groups capable of reacting with the fluorinated condensate. Particularly preferred substrates include ceramics, glass, metal, natural and man-made stone, polymeric materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), wood and fibrous substrates (such as textile, leather, carpet, paper). Various articles can be effectively treated with the fluorochemical composition of the present invention to provide a water and oil repellent coating thereon. Examples include ceramic tiles, bathtubs or toilets, glass shower panels, construction glass, various parts of a vehicle (such as the mirror or windscreen), glass, and ceramic or enamel pottery materials.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

To effect the treatment of a substrate, the fluorochemical composition, preferably in the form of a solvent composition as disclosed above, is applied to the substrate. The amount of fluorochemical composition to be coated on the substrate will generally be that amount sufficient to produce a coating which is water and oil repellent, such a coating having at 20° C. a contact angle with distilled water of at least 80°, and a contact angle with n-hexadecane of at least 40°, measured after drying and curing of the coating.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol.

The coating composition is typically a relatively diluted solution, containing between 0.05 and 30 percent by weight, preferably between 0.05 and 20 percent by weight, and more preferably, between 0.1 and 5 percent by weight of component (a) i.e. fluorochemical oligomer and component (b) i.e. non-fluorinated compound and/or partial or substantially complete condensation product of components (a) and (b). In one embodiment, the coating composition may contain unreacted components (a) and (b) in amounts of 0.05 to 10% by weight and 0.05 to 20% by weight respectively. In another embodiment, the composition may comprise a partial or substantially complete condensate of components (a) and (b) in an amount of 0.05% by weight to 50% by weight, preferably from 0.1% to 10% by weight.

In accordance with a preferred embodiment, compositions for application to a substrate are prepared by diluting a concentrate comprising a solution of at least 25% by weight of solids in an organic solvent, by adding to the concentrate an organic solvent or mixture of solvents.

A wide variety of coating methods can be used to apply a composition of the present invention, such as brushing, spraying, dipping, rolling, spreading, and the like. A preferred coating method for application of the fluorochemical composition includes spray application. A substrate to be coated can typically be contacted with the treating composition at room temperature (typically, about 20° C. to about 25° C.). Alternatively, the mixture can be applied to substrates that are preheated at a temperature of for example between 60° C. and 150° C. This is of particular interest for industrial production, where e.g. ceramic tiles can be treated immediately after the baking oven at the end of the production line. Following application, the treated substrate can be dried and cured at ambient or elevated temperature, e.g. at 40° to 300° C. and for a time sufficient to dry and cure. Alternatively, in addition with a thermal treatment, the coating composition may be cured by irradiation (e.g. by means of UV-irradiators, a laser, etc.) in a manner known per se, depending on the type and presence, respectively of an initiator. The process may also require a polishing step to remove excess material.

Preferably, the obtained coating on the substrate is cured, generally at an elevated temperature of 40 to 300° C. This curing step can be done at the beginning (application of the composition to a hot substrate) or at the end of the application process. In an alternative method, the coating can be cured by photochemical activation of materials represented in formula (XII).

EXAMPLES

The following examples further illustrate the invention without the intention however to limit the invention thereto. All parts are by weight unless indicated otherwise.

Abbreviations
FC: fluorochemical
EtAc: ethylacetate
MeFBSEA: N-methyl perfluorobutyl sulfonamido ethylacrylate
MeFOSEA: N-methyl perfluorooctyl sulfonamido ethylacrylate
A-174: $CH_2$=$C(CH_3)C(O)O(CH_2)_3Si(OCH_3)_3$, available from Aldrich
A-160: $HS(CH_2)_3Si(OCH_3)_3$, available from Aldrich
TEG: $HOCH_2CH_2OCH_2CH_2OCH_2CH_2OCH_3$, available from Aldrich
TEOS: tetraethoxysilane, available from Aldrich
FC-ether acrylate : $CF_3CF_2CF_2O[CF(CF_3)CF_2O]_vCF(CF_3)CH_2OC(O)CH$=$CH_2$ (v average 1.5) was prepared according to U.S. Pat. No. 4,889,656, example 27, starting from the corresponding FC-ether alcohol.
ABIN: azo(bis)isobutyronitrile 1. Methods of Application and Testing
   Coating Method
   The substrates were cleaned and degreased with acetone. After cleaning, the substrates were preheated to 80-90° C. Diluted mixtures of fluorochemical silane condensates or partial condensates in solvent, as given in the respective examples, were applied onto the hot substrates, by spray application at about 20 ml/minute. The substrates were dried and cured at 150° C. during 30 minutes. In an alternative coating method, the substrates were treated and dried at room temperature.

Contact Angles
   The treated substrates were tested for their contact angles versus water (W) and n-hexadecane (O) using an Olympus TGHM goniometer. The contact angles were measured before (initial) and directly after abrasion (abrasion), unless otherwise indicated. The values are the mean values of 4 measurements and are reported in degrees. The minimum meaningful value for a contact angle is 20°.
   Abrasion Test
   The treated substrates were abraded using an Erichsen cleaning machine, 3M High Performance Cloth (available from 3M) and CIF cleaner (available from Lever), using 40 cycles.

2. Synthesis of Fluorochemical Silane Condensates and Partial Condensates (FSC)
   A. Synthesis of Fluorochemical Silanes (FS)
   Fluorochemical silanes FS-1 to FS-5, FS-9, FS-11 and FS-12, as given in table 1, were made according to the procedure as given for MeFBSEA/A-160 4/1 (FS-1):
   In a three-necked flask of 500 ml, fitted with a condenser, stirrer and thermometer, were placed 41.1 g (0.1 moles) MeFBSEA, 4.9 g (0.025 moles) A-160, 46 g ethylacetate and 0.1 g AIBN. The mixture was degassed three times using aspirator vacuum and nitrogen pressure. The mixture was reacted under nitrogen at 75° C. during 8 hours. An additional 0.05 g AIBN was added and the reaction was continued for another 3 hrs at 75° C.; another 0.05 g AIBN was added and the reaction continued at 82° C. for 2 hrs. A clear solution of the oligomeric fluorochemical silane MeFBSEA/A-160 in a molar ratio 4/1 was obtained.
   B. Synthesis of Hydrolysable Fluorochemical Silanes FS-6 to FS-8
   Fluorochemical silanes FS-6 to FS-8, as given in table 1, were prepared similar to the 2 step synthesis of MeFBSEA/A-174/A-160/TEG (molar ratio: 2/2/1/9) (FS-6): In a first step, a fluorochemical oligomer MeFBSEA/A-174/A-160 2/2/1 was prepared. In a three-necked flask of 500 ml, fitted with a condenser, stirrer and thermometer, were placed 24.7 g (0.06 mol) MeFBSEA, 14.9 g (0.06 mol) A-174, 5.9 g (0.03 mol) A-160, 45 g ethylacetate and 0.1 g AIBN.
   The mixture was degassed three times using aspirator vacuum and nitrogen pressure. The mixture was reacted under nitrogen at 75° C. during 8 hours. An additional 0.05 g AIBN was added and the reaction was continued for another 16 hrs at 75° C.; another 0.05 g AIBN was added and reaction continued at 82° C. for 2 hrs. A clear solution of the oligomeric fluorochemical silane MeFBSEA/A-174/A-160 in a molar ratio 2/2/1 was obtained.
   In a second step, 44.3 g (0.27 moles) TEG and 20 g heptane were added. The alkoxide exchange reaction was done at a temperature of 100-180° C. for 6 hrs, while stripping off solvents and exchanged methanol. A brown, clear product was obtained which upon cooling became solid.
   Further examples were prepared using above procedure, using molar ratios of reactants as indicated in table 1.
   C. Fluorochemical Silane FS-10
   Fluorochemical silane FS-10 was prepared in a two-step reaction. In a first step, a fluorochemical oligomer MeFOSEA/$HSCH_2CH_2OH$ (molar ratio 4/1) was made according to the following procedure:
   A 3 l reaction flask, equipped with 2 reflux condensers, a mechanical teflon blade stirrer, a thermometer, a nitrogen inlet and vacuo outlet, was charged with 2.4 moles MeFOSEA and 987 g ethylacetate. The mixture was heated to 40° C. until all fluorochemical monomer was dissolved. 0.6 moles $HSCH_2CH_2OH$ and 0.15% ABIN was added and the solution was heated to 80° C., while stirring at 160 rpm. The reaction was run under nitrogen atmosphere at 80° C. during 16 hours, after which more than 95% conversion was obtained.

In a second step, the fluorochemical oligomer was reacted with an equimolar amount of isocyanato propyl triethoxysilane $OCN(CH_2)_3Si(OCH_2CH_3)_3$ according to the following method:

In a three necked flask of 500 ml, fitted with a condenser, stirrer and thermometer, were placed 83 g (0.02 mole) of a 60% solution of fluorochemical oligomer MeFOSEA/ $HSCH_2CH_2OH$ as prepared above, 22 g ethylacetate, 5 g (equimolar amounts) $OCN(CH_2)_3Si(OCH_2CH_3)_3$ and 2 drops stannous octoate catalyst, under nitrogen atmosphere. The mixture was heated up to 75° C. under nitrogen and reacted during 16 hours. No residual isocyanate could be detected by infra red analysis.

Further fluorochemical silanes were prepared using the above procedure and starting from the fluorochemical oligomers as given in table 2. The fluorochemical silanes were made by equimolar reaction of the fluorochemical oligomers with isocyanato propyl triethoxysilane. Comparative fluorochemical silane C—FC-2 was made by reacting MeFOSE with equimolar amounts of isocyanato propyl triethoxysilane.

TABLE 1

Composition of fluorochemical silanes

| FS | Composition | Molar ratio |
| --- | --- | --- |
| FS-1 | MeFBSEA/A-160 | 4/1 |
| FS-2 | MeFBSEA/A-174/A-160 | 4/1/1 |
| FS-3 | MeFBSEA/A-174 | 1.7/1.2 |
| FS-4 | MeFBSEA/A-174 | 1.95/0.8 |
| FS-5 | MeFOSEA/A-174/A-160 | 4/1/1 |
| FS-6 | MeFBSEA/A-174/A-160/TEG | 2/2/1/9 |
| FS-7 | MeFBSEA/A-174/A-160/TEG | 4/4/1/15 |
| FS-8 | MeFBSEA/A-174/A-160/TEG | 4/10/1/33 |
| FS-9 | FC-ether acrylate/A-174/A-160 | 4/1/1 |
| FS-10 | (MeFOSEA/HSCH$_2$CH$_2$OH 4/1)/ $OCN(CH_2)_3Si(OCH_2CH_3)_3$ | 1/1 |
| FS-11 | MeFBSEA/ODMA/A-174/A-160 | 6/1/1/1 |
| FS-12 | MeFBSEMA/A-174/A-160 | 4/1/1 |

D. Synthesis of $C_4F_9SO_2N(CH_3)(CH_2)_3Si(OCH_3)_3$

Fluorochemical compound $C_4F_9SO_2N(CH_3)(CH_2)_3Si(OCH_3)_3$, used in comparative examples C-1 and C-2 was made according to the following procedure:

A 3 necked reaction flask, fitted with a condenser, a stirrer, nitrogen inlet and thermometer, was charged with 0.1 moles $C_4F_9SO_2N(CH_3)H$ and 30 g dry dimethylformamide. 0.1 moles $NaOCH_3$ (30% solution in methanol) were added and the reaction mixture was heated for 1 hour at 50° C., under nitrogen. All methanol formed was stripped under aspirator vacuum, while keeping the temperature at 50° C. The reaction was cooled to 25° C., after which 0.1 moles $Cl(CH_2)_3Si(OCH_3)_3$ were added. The reaction mixture was heated at 90° C., during 16 hours, under nitrogen. NaCl, formed during the reaction was filtered off. The completion of the reaction was followed by GLC.

E. Synthesis of Fluorochemical Silane Condensates and Partial Condensates FSC

Fluorochemical silane condensates (FSC-1 to FSC-21), as given in table 2, were prepared similar to the synthesis of FSC-1 (FS-1/TEOS 50/50):

In a three-necked flask of 250 ml, fitted with a condenser, stirrer and thermometer, were placed 20 g of a 50% solution in ethyl acetate of FS-1, 10 g TEOS (tetraethoxysilane; available from Aldrich Co., Milwaukee, Wis.), 10 g ethanol, 2.0 g DI-$H_2O$ and 1.0 g acetic acid. The mixture was stirred at room temperature for 16 hrs to assure condensation of the reagents (at least 90% of silane groups were reacted). The reaction mixture was then diluted with ethanol to obtain a 1% fluorochemical solids solution.

Fluorochemical condensates FSC-23 to 25, as given in table 2, were prepared similar to the synthesis of FSC-22 (FS-2/TEOS 1/99):

In a three-necked flask of 100 ml, fitted with a condenser, stirrer and thermometer, were placed 0.4 g of a 50% solution in ethyl acetate of FS-2, 19.8 g TEOS, 20 g ethanol, 1.0 g DI-$H_2O$ and 1.0 g HCl (37%). The mixture was stirred at room temperature for 16 hrs to assure condensation of the reagents (at least 90% of silane groups were reacted). The reaction mixture was then diluted with ethanol to obtain a 1% solids solution.

Fluorochemical silane partial condensates (FSC-26 to FSC-29), as given in table 2, were made according to the procedure as given for the synthesis of FSC-27 (FS-1/TEOS 10/90):

A mixture containing 0.2 g fluorochemical silane FS-1, 1.8 g TEOS, 3 g DI-$H_2O$, 3 g acetic acid and 92 g ethanol (absolute) was stirred during about 1 hour at room temperature, resulting in the formation of a partial condensation product (less than 50% of silane groups reacted). This mixture was used to treat substrates Remaining active silane groups were allowed to crosslink and/or cure after application to the substrate.

Fluorochemical silane partial condensates (FSC-30 to FSC-41), as given in table 2, were made according to the procedure as given for the synthesis of FSC-30 (FS-2/TEOS 1/99):

0.4 g of a 50% solution of fluorochemical silane FS-2 in ethyl acetate was mixed with 19.8 g TEOS, 0.4 g HCl (37%) and 20 g ethanol (absolute). The mixture was used to treat substrates shortly after preparation.

Fluorochemical silane partial condensate (FSC-42) was made by mixing 0.4 g of a 50% solution of fluorochemical silane FS-2 in ethyl acetate with 19.8 g TEOS, 0.6 g acetic acid, 1.2 g DI-$H_2O$ and 20 g ethanol (absolute). The mixture was used to treat substrates shortly after preparation.

TABLE 2

Composition of fluorochemical silane condensates (FSC)

| FSC | Compounds | Weight ratio | Solvent mixture |
| --- | --- | --- | --- |
| Fluorochemical condensates (16 hrs RT) | | | |
| FSC-1 | FS-1/TEOS | 50/50 | Ethanol/EtAc 50/50 |
| FSC-2 | FS-1/TEOS | 10/90 | Ethanol/EtAc 95/5 |
| FSC-3[(3)] | FS-1/Ti(OC$_3$H$_7$)$_4$ | 50/50 | Ethanol/EtAc 50/50 |

TABLE 2-continued

Composition of fluorochemical silane condensates (FSC)

| FSC | Compounds | Weight ratio | Solvent mixture |
|---|---|---|---|
| FSC-4 | FS-1/TEOS/3-aminopropyltrimethoxysilane[1] | 10/85/5 | Ethanol/EtAc 95/5 |
| FSC-5 | FS-1/TEOS/A-174 | 50/45/5 | Ethanol/EtAc 50/50 |
| FSC-6 | FS-1/TEOS/epoxy-$CH_2O(CH_2)_3Si(OCH_3)_3$[1] | 50/45/5 | Ethanol/EtAc 50/50 |
| FSC-7 | FS-2/TEOS | 50/50 | Ethanol |
| FSC-8 | FS-2/TEOS | 10/90 | Ethanol |
| FSC-9 | FS-3/TEOS | 50/50 | Ethanol |
| FSC-10 | FS-3/TEOS/3-aminopropyltrimethoxysilane[1] | 10/85/5 | Ethanol |
| FSC-11 | FS-3/TEOS/HN[$CH_2CH_2CH_2Si(OCH_3)_2$][2] | 50/49/1 | Ethanol |
| FSC-12 | FS-3/$CH_3Si(OCH_3)_3$[1] | 50/50 | Ethanol |
| FSC-13 | FS-3/TEOS/$(CH_3O)_3Si(CH_2)_3NH$—$CH_2CH_2NH(CH_2)_3Si(OCH_3)_3$[2] | 50/49/1 | Ethanol |
| FSC-14 | FS-4/TEOS | 50/50 | Ethanol |
| FSC-15 | FS-5/TEOS | 50/50 | Ethanol/EtAc 50/50 |
| FSC-16 | FS-9/TEOS | 50/50 | Ethanol/EtAc 50/50 |
| FSC-17 | FS-6/TEOS | 10/90 | Ethanol |
| FSC-18 | FS-7/TEOS | 10/90 | Ethanol |
| FSC-19 | FS-7/TEOS | 50/50 | Ethanol |
| FSC-20 | FS-8/TEOS | 10/90 | Ethanol |
| FSC-21 | FS-10/TEOS | 50/50 | Ethanol/EtAc 50/50 |
| FSC-22 | FS-2/TEOS | 1/99 | Ethanol/EtAc 99/1 |
| FSC-23 | FS-2/TEOS | 2/98 | Ethanol/EtAc 98/2 |
| FSC-24 | FS-2/TEOS | 3/97 | Ethanol/EtAc 97/3 |
| FSC-25 | FS-2/TEOS | 10/90 | Ethanol/EtAc 91/9 |
| Fluorochemical partial condensates (1 hr RT) | | | |
| FSC-26 | FS-1/TEOS | 50/50 | Ethanol/EtAc 50/50 |
| FSC-27 | FS-1/TEOS | 10/90 | Ethanol/EtAc 95/5 |
| FSC-28[3] | FS-1/$Ti(OC_3H_7)_4$ | 50/50 | Ethanol/EtAc 50/50 |
| FSC-29 | FS-1/TEOS/3-aminopropyltrimethoxysilane[1] | 10/85/5 | Ethanol/EtAc 95/5 |
| Fluorochemical partial condensates (max 20 min) | | | |
| FSC-30 | FS-2/TEOS | 1/99 | Ethanol/EtAc 99/1 |
| FSC-31 | FS-2/TEOS | 2/98 | Ethanol/EtAc 98/2 |
| FSC-32 | FS-2/TEOS/$CH_3Si(OCH_3)_3$[1] | 2/50/48 | Ethanol/EtAc 98/2 |
| FSC-33 | FS-2/TEOS/Octadecyltrimethoxysilane | 2/97/1 | Ethanol/EtAc |
| FSC-34 | FS-2/TEOS/epoxy-$(CH_2)_3Si(OCH_3)_3$ | 2/97/1 | Ethanol/EtAc 98/2 |
| FSC-35 | FS-2/TEOS/aminopropyltrimethoxysilane[1] | 2/97.5/0.5 | Ethanol/EtAc 98/2 |
| FSC-36 | FS-11/TEOS | 2/98 | Ethanol/EtAc 98/2 |
| FSC-37 | FS-1/TEOS | 1/99 | Ethanol/EtAc 99/1 |
| FSC-38 | FS-12/TEOS | 2/98 | Ethanol/EtAc 98/2 |
| FSC-39 | FS-5/TEOS | 2/98 | Ethanol/EtAc 98/2 |
| FSC-40 | FS-2/TEOS | 10/90 | Ethanol/EtAc 91/9 |
| FSC-41 | FS-2/TEOS | 50/50 | Ethanol/EtAc 67/33 |
| FSC-42 | FS-2/TEOS | 2/98 | Ethanol/EtAc 98/2 |

Notes:
[1] available from Aldrich Co
[2] available from ABCR, Germany
[3] no water was added in preparing these compositions, however, 0.5% water was added during treatment of the substrates with these compositions.

EXAMPLES

Examples 1 to 21 and Comparative Examples C-1 to C-3

In examples 1 to 21, 1% fluorochemical silane condensates, as given in table 3, and prepared according to the general procedure, were sprayed onto white glazed tiles from Sphinx, preheated at 80-90° C. In example 5, also 0.2% by weight of a UV-catalyst (Irgacure 651) was added. Comparative example C-1 was made with a mixture containing 5% $C_4F_9SO_2N(CH_3)(CH_2)_3Si(OCH_3)_3$, 3% acetic acid, 10% water and 82% ethanol. The tiles of comparative example C-2 were treated with a composition of C-1, also containing TEOS. The treated tiles were cured at 150° C. during 30 minutes. The treated tiles of example 5 were UV cured at 350 nm during 1 min, prior to thermal cure. After cooling to 50° C., excess product was polished off with a paper wipe. For comparative example C-3, tiles were treated with a fluorochemical oligomer, prepared and applied as in U.S. Pat. No. 5,527,931, example 3. Contact angles were measured before and after abrasion with an Erichsen cleaning machine. The results are given in table 3.

TABLE 3

Contact angles of wall tiles treated with fluorochemical silane condensates

| | | Contact angles (°) | | | |
| | Fluorochemical silane | Water | | n-Hexadecane | |
| Ex | condensates | Initial | Abrasion | Initial | Abrasion |
|---|---|---|---|---|---|
| 1 | FSC-1 | 94 | 64 | 54 | 30 |
| 2 | FSC-2 | 90 | 67 | 58 | 32 |
| 3 | FSC-3 | 95 | 62 | 58 | 32 |
| 4 | FSC-4 | 89 | 56 | 55 | 30 |
| 5 | FSC-5 | 90 | 70 | 55 | 40 |
| 6 | FSC-6 | 95 | 68 | 55 | 35 |
| 7 | FSC-7 | 92 | 60 | 56 | 32 |
| 8 | FSC-8 | 90 | 65 | 59 | 35 |
| 9 | FSC-9 | 92 | 56 | 56 | 29 |
| 10 | FSC-10 | 92 | 56 | 55 | 30 |
| 11 | FSC-11 | 90 | 60 | 50 | 32 |
| 12 | FSC-12 | 95 | 65 | 52 | 35 |
| 13 | FSC-13 | 90 | 63 | 52 | 29 |
| 14 | FSC-14 | 95 | 68 | 52 | 35 |
| 15 | FSC-15 | 105 | 78 | 67 | 45 |
| 16 | FSC-16 | 108 | 83 | 63 | 48 |
| 17 | FSC-17 | 94 | 74 | 62 | 38 |
| 18 | FSC-18 | 98 | 70 | 60 | 40 |
| 19 | FSC-19 | 97 | 72 | 63 | 45 |
| 20 | FSC-20 | 95 | 67 | 60 | 35 |
| 21 | FSC-21 | 105 | 80 | 65 | 50 |
| C-1 | $C_4F_9SO_2N(CH_3)(CH_2)_3Si(OCH_3)_3$ (5%) | 82 | 45 | 45 | 20 |
| C-2 | $C_4F_9SO_2N(CH_3)(CH_2)_3Si(OCH_3)_3$/ TEOS 50/50 (5%) | 85 | 50 | 40 | 20 |
| C-3 | Example 3 of U.S. Pat. No. 5,527,931 | 80 | 50 | 40 | <20 |

The results indicated that tiles with high oil- and water-repellency could be made by using fluorochemical polycondensate compositions according to the invention. High contact angles were measured, initially, but especially also after abrasion, indicating that highly durable coatings were made. To the contrary, the comparative examples had inferior oil and/or water repellency after abrasion. The fluorochemical silane condensates according to the invention and applied at 1%, clearly showed higher performance than the fluorochemical silane compounds of comparative examples C-1 or C-2 that were applied at 5%. Furthermore, tiles treated with a FC condensate, made from a silane terpolymer, containing hydrophilic, hydrophobic and oleophobic functional groups, as in comparative example C-3 had inferior oil and/or water repellency properties.

Examples 22 to 25

In Examples 22 to 25, fluorochemical silane partial condensates FSC-26 to FSC-29 were used to treat preheated white glazed tiles by means of spray application. The treated tiles were heat cured at 150° C. during 30 minutes. After cooling to 50° C., excess product was polished off with a paper wipe. Contact angles were measured before and after abrasion with an Erichsen cleaning machine. The results are given in table 4.

TABLE 4

Contact angles of treated tiles

| | | Contact angles (°) | | | |
| | Fluorochemical silane | Water | | n-Hexadecane | |
| Ex | condensates | Initial | Abrasion | Initial | Abrasion |
|---|---|---|---|---|---|
| 22 | FSC-26 | 100 | 65 | 62 | 30 |
| 23 | FSC-27 | 104 | 69 | 64 | 38 |
| 24 | FSC-28 | 95 | 60 | 62 | 32 |
| 25 | FSC-29 | 96 | 66 | 64 | 35 |

As can be seen from the results in the table, good oil and water-repellency could be obtained when the tiles were treated with the fluorochemical oligomeric partial condensates. Not only good initial repellency was observed, but also good abrasion resistance.

Examples 26 to 29

In examples 26 to 29, 1% fluorochemical silane condensates, as given in table 3, and prepared according to the general procedure, were sprayed onto white glazed tiles from Sphinx, preheated at 80-90° C. Excess product was removed after 10 minutes, using a soft wipe. Contact angles were measured before and after abrasion with an Erichsen cleaning machine. The results are given in table 5.

TABLE 5

Contact angles of wall tiles treated with fluorochemical silane condensates

| Fluorochemical silane | Contact angles (°) | | | |
|---|---|---|---|---|
| | Water | | n-Hexadecane | |
| Ex | condensates | Initial | Abrasion | Initial | Abrasion |
|---|---|---|---|---|---|
| 26 | FSC-22 | 103 | 85 | 65 | 50 |
| 27 | FSC-23 | 110 | 88 | 70 | 53 |
| 28 | FSC-24 | 105 | 83 | 68 | 50 |
| 29 | FSC-25 | 102 | 80 | 65 | 48 |

The results indicated that tiles with high oil- and water-repellency could be made by using fluorochemical polycondensate compositions according to the invention. High contact angles were measured, initially, but especially also after abrasion, indicating that highly durable coatings.

Examples 30 to 42 and Comparative Example C-4

In examples 30 to 42, 1% fluorochemical silane condensates, as given in table 3, and prepared according to the general procedure, were sprayed onto white glazed tiles from Sphinx, at room temperature. The treated tiles were allowed to dry at room temperature for 30 min, after which excess product was removed. using a soft wipe. Contact angles were measured before and after abrasion with an Erichsen cleaning machine. The results are given in table 6.

TABLE 6

Contact angles of wall tiles treated with fluorochemical silane condensates

| Fluorochemical silane | Contact angles (°) | | | |
|---|---|---|---|---|
| | Water | | n-Hexadecane | |
| Ex | condensates | Initial | Abrasion | Initial | Abrasion |
|---|---|---|---|---|---|
| 30 | FSC-30 | 106 | 85 | 71 | 47 |
| 31 | FSC-31 | 108 | 90 | 67 | 54 |
| 32 | FSC-32 | 112 | 88 | 65 | 51 |
| 33 | FSC-33 | 110 | 86 | 64 | 49 |
| 34 | FSC-34 | 105 | 78 | 65 | 52 |
| 35 | FSC-35 | 105 | 80 | 63 | 49 |
| 36 | FSC-36 | 102 | 78 | 72 | 52 |
| 37 | FSC-37 | 106 | 92 | 68 | 52 |
| 38 | FSC-38 | 105 | 79 | 62 | 47 |
| 39 | FSC-39 | 118 | 95 | 75 | 56 |
| 40 | FSC-40 | 108 | 84 | 68 | 53 |
| 41 | FSC-41 | 107 | 79 | 67 | 49 |
| 42 | FSC-42 | 108 | 84 | 68 | 53 |
| C-4 | TEOS/HCl (37%) 100/1 | 32 | <20 | <20 | <20 |

The results indicated that tiles with high oil- and water-repellency could be made by using fluorochemical polycondensate compositions at room temperature. High contact angles were measured, initially, but especially also after abrasion, indicating that highly durable coatings.

The invention claimed is:

1. Fluorochemical composition comprising between about 0.05 and 50 percent by weight of the condensation product of (a), (b), (c), and (d) wherein:
   (a) one or more fluorochemical oligomers derivable from a free radical polymerization of one or more monovalent fluorinated monomers and optionally one or more non-fluorinated monomers in the presence of a chain transfer agent, said fluorochemical oligomer being free of acid groups and comprising one or more groups of the formula:

$$-M^1(R)_q(Y)_{p-q-1} \quad (I)$$

wherein $M^1$ is Si, R represents a non-hydrolysable group, Y represents a hydrolysable group, q is 0, 1 or 2, p is 4 and $p-q-1$ is at least 1; and
   (b) one or more non-fluorinated compounds of the formula $$(R^2)_i M^2(Y^7)_{j-i} \quad (VII)$$

wherein $R^2$ represents a non-hydrolysable group, $M^2$ is Si, j is 4, i is 0,1 or 2, and $Y^7$ represents a hydrolysable group and having at least two hydrolysable groups per molecule (a); wherein the weight ratio of said (a) oligomers to said (b) non-fluorinated compounds is from about 2:1 to about 1:100
   (c) is crosslinking agent being a compound of an element $M^3$ that is selected from the group consisting of Si, Ti, Zr, B, Al, Ge, V, Pb, Sn and Zn, said crosslinking agent further having at least one hydrolysable group and at least one reactive functional group per molecule that is capable of engaging in a crosslinking reaction and
   (d) is sufficient water to effect hydrolysis of said hydrolysable groups;
   wherein said condensation product is dispersed or dissolved in
   (e) organic solvent selected from the group consisting of aliphatic alcohols, ketones, esters, ethers, and mixture thereof.

2. Fluorochemical composition according to claim 1 wherein said fluorinated monomer corresponds to the formula:

$$R_f-X-E \quad (II)$$

wherein $R_f$ represents a monovalent perfluorinated aliphatic group having at least 3 carbon atoms or a perfluorinated polyether group, X represents an organic divalent linking group and E represents ethylenically unsaturated group.

3. Fluorochemical composition according to claim 2 wherein said group $R_f$ of said fluorinated monomer is selected from a perfluorinated aliphatic group of 4 carbon atoms, a perfluorinated polyether group according to the formula $C_3F_7O(CF(CF_3)CF_2O)_pCF(CF_3)$— wherein p has a value of 1 to 50, and a mixture thereof.

4. Fluorochemical composition according to claim 2 wherein said ethylenically unsaturated group is non-fluorinated.

5. Fluorochemical composition according to claim 1 wherein said one or more groups of formula (I) are contained in units derived from said one or more non-fluorinated monomers or in a residue derived from said chain transfer agent.

6. Fluorochemical composition according to claim 1 wherein said fluorochemical oligomer corresponds to the general formula:

$$A-M^f_n M^h_m M^a_r-G \quad (III)$$

wherein A represents hydrogen or the residue of an initiating species; $M^f$ represents units derived from one or more fluorinated monomers; $M^h$ represents units derived from one or more non-fluorinated monomers; $M^a$ represents units having a silyl group represented by the formula:

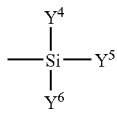

(IV)

wherein each of $Y^4$, $Y^5$ and $Y^6$ independently represents an alkyl group, an aryl group or a hydrolyzable group;
G is a monovalent organic group comprising the residue of a chain transfer agent; n represents a value of 1 to 100; m represents a value of 0 to 100; and r represents a value of 0 to 100; and
n+m+r is at least 2;
with the proviso that at least one of the following conditions is fulfilled:
(a) G contains a silyl group of the formula:

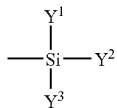

(V)

wherein $Y^1$, $Y^2$ and $Y^3$ each independently represents an alkyl group, an aryl group or a hydrolyzable group or
(b) r is at least 1 and at least one of $Y^4$, $Y^5$ and $Y^6$ represents a hydrolyzable group.

7. Fluorochemical composition according to claim 1 further comprising an acid or base catalyst.

8. Fluorochemical composition according to claim 1 wherein said condensation product is a condensation product obtained after a substantially complete condensation reaction of said one or more fluorochemical oligomers and said one or more non-fluorinated compounds.

9. Fluorochemical composition according to claim 1 wherein said condensation product is a partial condensate derived from a partial condensation of said one or more fluorochemical oligomers and said one or more non-fluorinated compounds.

10. Method of treating a substrate, comprising the steps of coating at least part of the surface of said substrate with a fluorochemical composition as defined in claim 1.

11. Method according to claim 10 wherein said method further involves the step of subjecting the coated substrate to an elevated temperature in the range of 40 to 300° C.

12. Method according to claim 11 wherein said substrate is glass, ceramic, metal, a fibrous or a polymeric substrate.

13. Fluorochemical composition according to claim 2 wherein $R_f$ represents a monovalent perfluorinated aliphatic group having at least 3 carbon atoms or a perfluorinated polyether group, X represents an organic divalent linking group and E represents

—OC(O)C(R)=CH$_2$ wherein R is hydrogen or a lower alkyl.

14. Fluorochemical composition according to claim 1 wherein said organic solvent is selected from the group consisting of ethanol, isopropylalcohol, methyl ethyl ketone, and acetone.

* * * * *

UNITED STATES PATENT AND TRADEMARK OFFICE
CERTIFICATE OF CORRECTION

PATENT NO.       : 7,470,741 B2
APPLICATION NO.  : 10/444879
DATED            : December 30, 2008
INVENTOR(S)      : Rudolf J. Dams It is certified that error appears in the above-identified patent and that said Letters Patent is hereby corrected as shown below:

Column 6

Line 7-12; delete
"* —COQ' $R^1$-Q"—CO —, *—COO— $CH_2$ —CH(OH)—
$R^1$-Q' —CO , *-$L^1$-Q'—CONH-$L^2$-, *—$R^1$-Q' CO *
 COQ'—$R^1$—, $R^1$ , * COQ'—$R^1$ -Q'-, *
—$SO_2NR^\alpha$—$R^1$-Q'-,*—$SO_2NR^\alpha$—$R^1$—
and
* $SO_2$ $NR^\alpha$ —R'-Q"—CO— ," and
insert
-- *—COQ'—$R^1$ —Q "—CO—,
*—COO—$CH_2$—CH(OH)—$R^1$—Q'—CO—,
*—$L^1$—Q'—CONH—$L^2$—, *—$R^1$ —Q'—CO—,
*—COQ'—$R^1$—,— $R^1$—, *—COQ'—$R^1$— Q' -,
*—$SO^2NR^a$—$R^1$—Q'—, *—$SO_2NR^a$—$R^1$—, and
*—$SO_2NR^a$—$R^1$—Q'—CO—, --, therefor.

Column 9

Line 10; delete "vinylcloride" and insert -- vinylchloride --, therefor.

Column 11

Line 14; delete "X." and insert -- X: --, therefor.

Line 27; delete "cylcopentyl," and insert -- cyclopentyl, --, therefor.

Signed and Sealed this
Twenty-second Day of February, 2011

David J. Kappos
*Director of the United States Patent and Trademark Office*

CERTIFICATE OF CORRECTION (continued)
U.S. Pat. No. 7,470,741 B2

Column 13

Line 5; delete "cylcopentyl," and insert -- cyclopentyl, --, therefor.

Column 23-24

Line 31; column 4, after "Ethanol/EtAc" insert -- 98/2 --.

Column 27

Line 64; Claim 1, before "one" insert -- is --.

Column 27

Line 64; Claim 1, delete "derivable" and insert -- derived --, therefor.

Column 28

Line 10; Claim 1, before "one" insert -- is --.